No. 778,894. Patented January 3, 1905.

UNITED STATES PATENT OFFICE.

CHARLES J. REED, OF PHILADELPHIA, PENNSYLVANIA, ASSIGNOR TO SECURITY INVESTMENT COMPANY, A CORPORATION OF PENNSYLVANIA.

PROCESS OF MAKING SPONGY LEAD FOR SECONDARY-BATTERY ELECTRODES.

SPECIFICATION forming part of Letters Patent No. 778,894, dated January 3, 1905.

Application filed May 7, 1903. Serial No. 156,094.

*To all whom it may concern:*

Be it known that I, CHARLES J. REED, a citizen of the United States, and a resident of Philadelphia, in the county of Philadelphia and State of Pennsylvania, have invented a new and useful Improvement in Processes of Making Spongy Lead for Secondary-Battery Electrodes, of which the following is a specification.

My invention relates to secondary batteries, and particularly to processes of making finely-divided or spongy lead for use in such batteries.

The object of my invention is to provide an easily-practiced and inexpensive process for making finely-divided lead without electrolytic action, and therefore one which will consume a comparatively small amount of time and in which scrap or waste materials may be advantageously utilized.

In practicing my invention I mix one or more compounds of lead in a powdered condition—such, for example, as oxid, chlorid, or sulfate of lead—with finely-divided metallic zinc or "zinc-dust" in chemically-equivalent proportions. This powder when thoroughly mixed is subjected to a liquid of such composition as will decompose the lead compound into metallic lead and oxygen, chlorin, or sulfuric acid, according to the particular lead compound employed. The oxygen, chlorin, or sulfuric acid unites with the zinc to form a zinc salt that is easily washed out by means of water, leaving pure metallic lead in a spongy form.

Among the materials which may be utilized in practicing my process are red lead and zinc-dust in chemically-equivalent proportions and a solution of zinc chlorid. The mixture of powdered materials may be treated with the solution while in a loose form to produce the finely-divided lead for subsequent application to a suitable electrode plate or frame, or the mixture of powdered materials may be slightly dampened and applied to the plate or frame as a solid coherent mass, then dried out sufficiently to make it suitably absorbent, then subjected to the reducing liquid until the composition has been completely converted into metallic lead and a zinc salt, and finally subjected to a water-bath for a sufficient length of time to remove the zinc salt. The plate thus formed is ready for use in a secondary battery.

It may be sometimes found advisable to mix with the powdered material a soluble, inert, granular material—such as sugar, salt, or zinc sulfate—which may be readily dissolved out after the conversion of the lead compound to metallic lead has taken place, thus leaving pores or openings for the entrance of the liquid electrolyte of the battery.

Other variations of a minor character may of course be made without departing from the spirit and scope of my invention—as, for example, the proportions of zinc may be more or less than the exact equivalent of the lead and the spongy lead may be subjected to a process of compression or reversal before being used as a battery-plate.

I claim as my invention—

1. The process of forming spongy or finely-divided lead for secondary-battery electrodes, which consists in mixing one or more compounds of lead with finely-divided metallic zinc, then subjecting such mixture to a liquid which will convert the lead compound into metallic lead and the zinc into a soluble zinc salt and lastly washing out the zinc salt.

2. The process of making finely-divided or spongy lead for secondary-battery electrodes, which consists in mixing a powdered compound of lead and zinc-dust in chemically-equivalent proportions, subjecting the mixture to a suitable liquid to transform the lead compound into metallic lead and the zinc into a soluble zinc salt and finally washing out the zinc salt.

3. The process of making finely-divided or spongy lead for secondary-battery electrodes, which consists in mixing a powdered lead oxid with zinc-dust in chemically-equivalent proportions, subjecting the mixture to a solution of zinc chlorid and finally washing out the soluble compound of zinc thus formed.

4. The process of making a secondary-battery electrode, which consists in adding to a lead plate a coating or filling of a mixture of powdered lead oxid and zinc-dust combined in chemically-equivalent proportions, subjecting the plate thus formed to a solution of zinc chlorid and finally washing out the resulting zinc compound thus formed.

5. The process of making a secondary-battery electrode, which consists in filling the openings in a lead plate or frame with a mixture of powdered lead oxid and zinc-dust combined in chemically-equivalent proportions and a soluble, granular, inert material, subjecting the plate thus formed to the action of a solution of zinc chlorid and finally washing out the resulting zinc compound and the inert material.

6. The process of making a secondary-battery plate, which consists in mixing powdered lead oxid, zinc-dust and a soluble, granular, inert material, applying such mixture to a lead plate, subjecting the plate to the action of a solution of zinc chlorid until the liquid acts upon the entire body of material and then washing out the resulting zinc salt and the inert material.

7. The process of forming spongy or finely-divided lead for secondary-battery electrodes, which consists in mixing a compound of lead with finely-divided metallic zinc and then supplying to said mixture a liquid which will convert the lead compound into metallic lead and the zinc into a soluble zinc salt, all without the application of heat, and finally washing out the zinc salt.

In testimony whereof I have hereunto subscribed my name this 23d day of March, 1903.

CHARLES J. REED.

Witnesses:
WALTER H. HART,
WILLIAM A. ROBBINS.